April 27, 1943.     H. P. CHANDLER     2,317,667
JUNCTION BOX
Filed Dec. 18, 1941     3 Sheets-Sheet 1

HOMER P. CHANDLER DEC'D. Inventor
By Lillian C. Chandler, Admx
Attorney

April 27, 1943.  H. P. CHANDLER  2,317,667
JUNCTION BOX
Filed Dec. 18, 1941   3 Sheets-Sheet 2
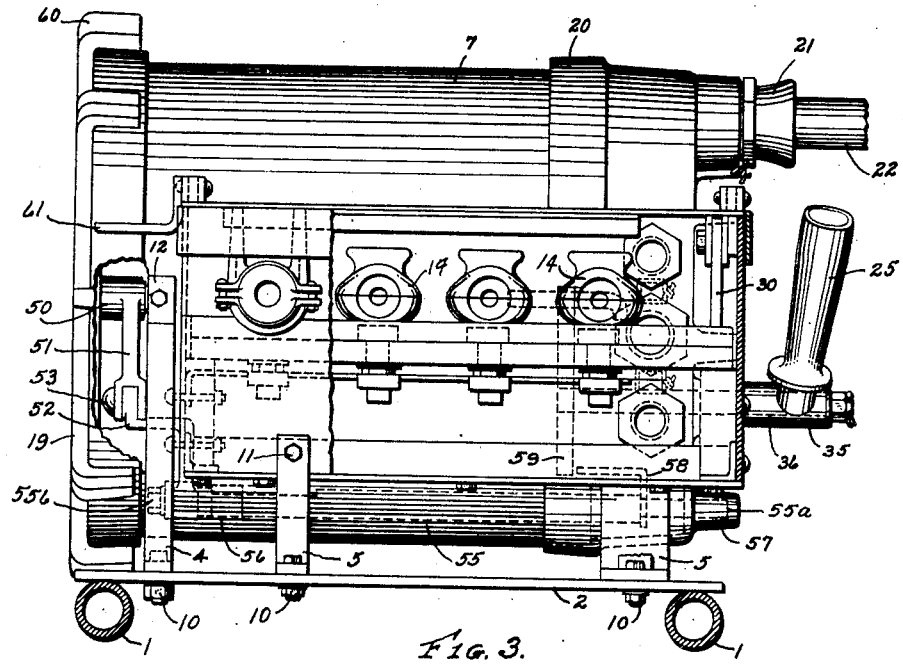
F1G. 3.
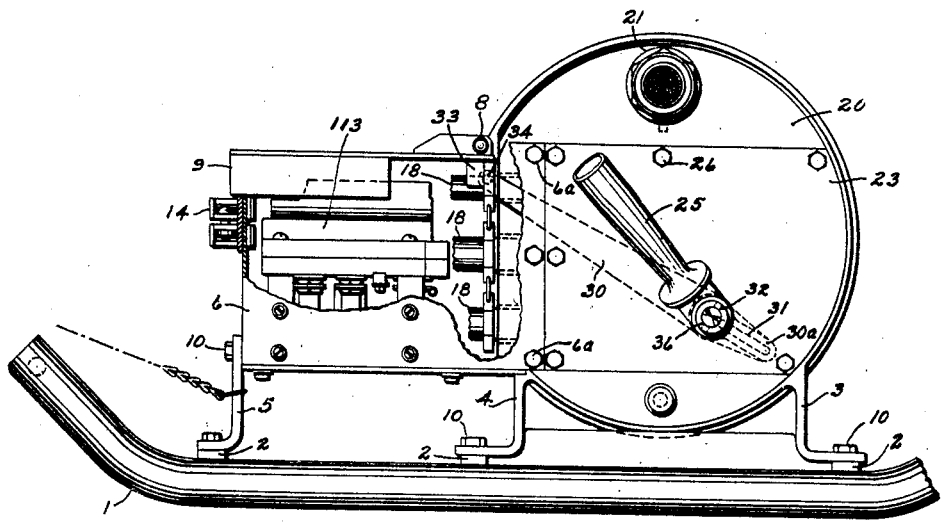
F1G. 4.
HOMER P. CHANDLER DEC'D. Inventor
Lillian C. Chandler, Admx.
By
Alfred F. Rees
Attorney April 27, 1943.  H. P. CHANDLER  2,317,667
JUNCTION BOX
Filed Dec. 18, 1941  3 Sheets-Sheet 3

HOMER P. CHANDLER DEC'D.
Inventor
Lillian C. Chandler, Admx.
By
Alfred F. Rees
Attorney Patented Apr. 27, 1943

2,317,667

UNITED STATES PATENT OFFICE 2,317,667

JUNCTION BOX

Homer P. Chandler, deceased, late of Mansfield, Ohio, by Lillian C. Chandler, administratrix, Mansfield, Ohio, assignor to The Ohio Brass Company, Mansfield, Ohio Application December 18, 1941, Serial No. 423,504

15 Claims. (Cl. 200—50)

This invention relates to portable distribution systems for electric power and more particularly relates to a distribution mechanism particularly adapted for use in mining operations and to cover mechanisms for such devices that are interlocked with the switch therein such that the switch must be opened before the cover or covers can be opened.

The object of this invention is to construct an electric power distribution mechanism providing multiple outlets and a switch therefor in which the covers to the switch housing and the outlet housing are interlocked with said switch.

A further object of the invention is to provide a portable power distribution device in which the switch housing encloses a plurality of fuse clips accessible from one end of the switch housing to which a removable cover is secured that is interlocked with the outlet box cover and the switch and which interlocking mechanisms prevent closure of the switch when the covers are in an open position.

Another object of the invention is to provide a power distribution mechanism in which the switch thereof is locked in an open position until the cover to the switch housing has been closed.

Another object of the invention is to provide an interlock between the cover for the outlet couplings and the cover for the switch housing each of which incorporates means interlocking with the switch such that it is held in open position until the switch housing cover is restored or closed.

A further object of the invention is to provide an interlock between the outlet cover and the switch housing cover of a portable distribution box which prevents the removal of the switch housing cover until the outlet cover has been opened.

A still further object of the invention is to provide a portable power distribution device having an outlet cover and a switch box cover interlocked with each other and with the switch such that the outlet cover must be opened before the switch box cover is opened and whose interlinked mechanism provides for locking the switch in an open position when the switch box cover is open.

Other objects of the invention are to increase the safety of portable electric distribution systems, provide for more economical manufacture, to increase the utility of the device and to simplify the maintenance thereof.

Other and further objects of the invention will occur to those skilled in the arts to which this invention pertains as the description proceeds which taken in connection with the accompanying drawings sets forth the preferred embodiment of the invention but such disclosure is not to be construed as a limitation of the device which is limited only by the appended claims and any and all modifications, alterations and variations of structure coming within the spirit and scope thereof are deemed to be included herein.

In the drawings:

Fig. 3 shows an elevational view with parts in section to show structural details.

Fig. 4 shows a side elevational view of the switch operating side of the distribution box.

Figure 1:
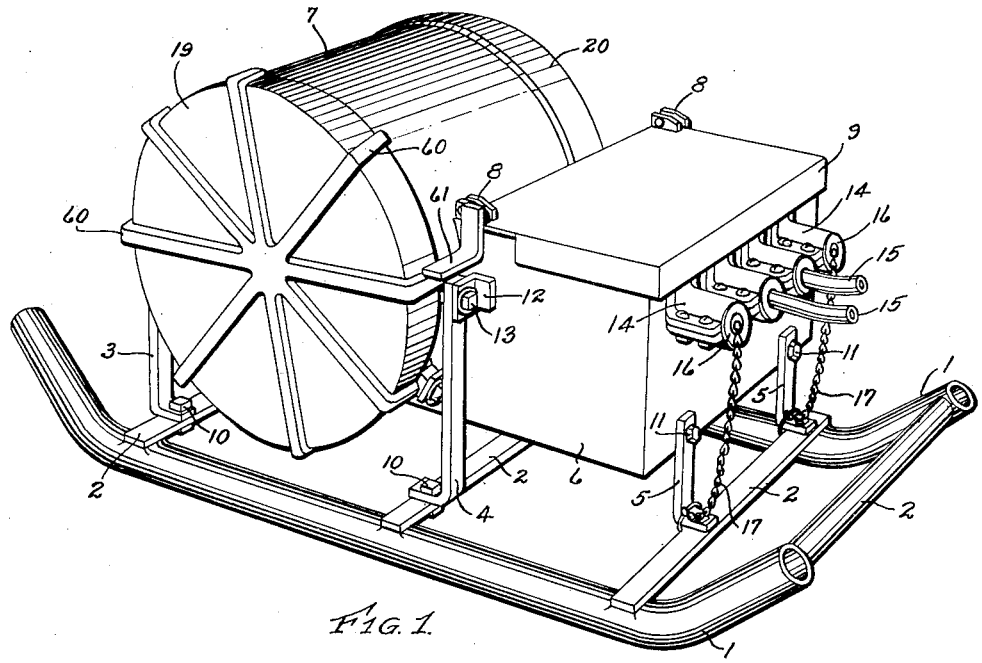
Fig. 1 shows a perspective view of the portable power distribution device incorporating the invention.

Portable distribution devices for electric power have in the past incorporated switch mechanisms that are encased in housings and in which there are arranged a plurality of plug connectors to which cables are connected to supply power to one or more current consuming devices. These junction boxes or portable distribution mechanisms find their most common use in mining operations to supply power to such varied items as drills, coal breakers, conveyor systems and various other kinds of tools employed in mining operations. These boxes are equipped with openable and removable covers that in one fashion or another have been interlocked with the disconnect switch associated with the boxes, but have provided no means to effectively protect an operator from coming into contact with one or more live wires when working on the box, even though the disconnect switch may have been in an open position by reason of the open cover on the distribution box. Applicant has provided a mechanism in which the switch for connecting or disconnecting the incoming power to the several power outlets is completely segregated from the housing containing the plug connectors from which power is taken off to the several power consuming devices supplied therefrom. An interlock has been provided between the cover for the plug connector box, the cover for the switch and fuse clip housing, which provides that the switch must be in an open position before a cover to the plug connector box is open and in which the cover to the switch housing cannot be opened until the plug connector box is opened and which will lock the disconnect switch in an open position as long as the cover to the switch housing is in its open position.

The accomplishment of the above results is obtained in the mechanism set forth in the several figures of the drawings in which 1, 1 are appropriate skid shoes connected together by means of a plurality of cross-members or bars 2, 2 and whereby the distribution mechanism may be transported from one place to another with comparative ease. Fixed to the several cross-bar members 2, 2 are a plurality of pedestals or uprights 3, 4 and 5 that are secured to the transverse members 2, 2 by means of a plurality of bolts 10, 10, etc. A housing 6 containing the plug connectors subsequently described is supported on the uprights 4 and 5 by means of screws 11, 11 and further by means of the bracket 12 integrally associated with one of the walls of the box 6 through which a screw 13 is passed to secure same to the upright 4. The opposite end of the plug connector box is secured to the cover 20 of the housing 7.

Figure 5:
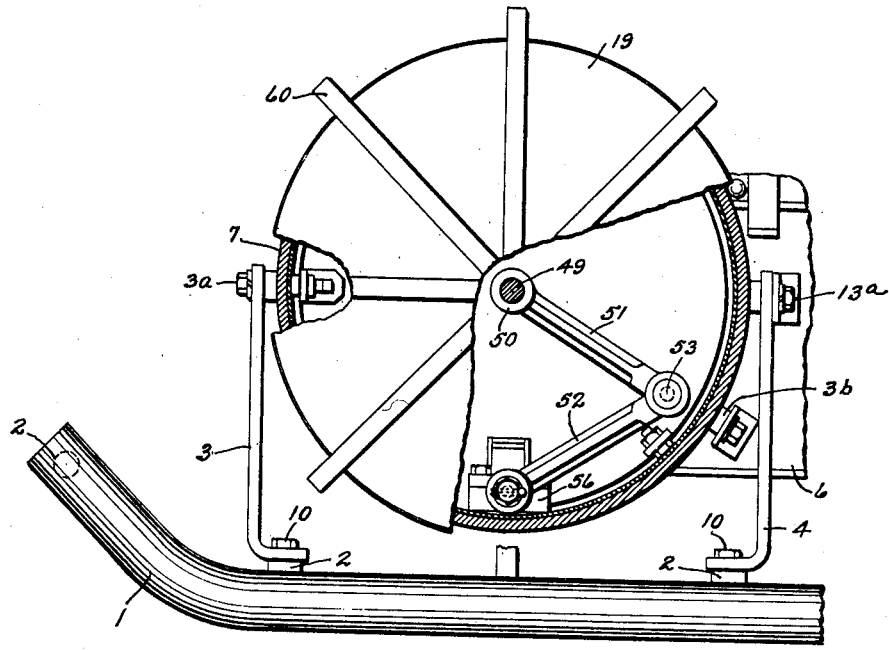
Fig. 5 shows an end elevational view of the switch housing with a portion of the cover broken away to show structural details.

The switch and fuse clip housing 7 is likewise supported on the pedestal elements 3 and 4 by means of screw elements 3a and 13a (see Fig. 5), is secured to box 6 by screw and bracket 3b, the latter of which, also, supports the housing 6 associated with the housing 7 and supporting same in a horizontal position, as shown in the several views of the drawings. On its opposite end the cover 20 has uprights 3 and 4 secured to bars 2, 2 to support same. Screws 6a secure one end of box 6 to cover 20.

Plug connector box 6 is equipped with a cover 9 that is pivoted to the main body of the housing 6 by means of hinges 8, 8, as clearly shown in Fig. 1 of the drawings.

Figure 2:
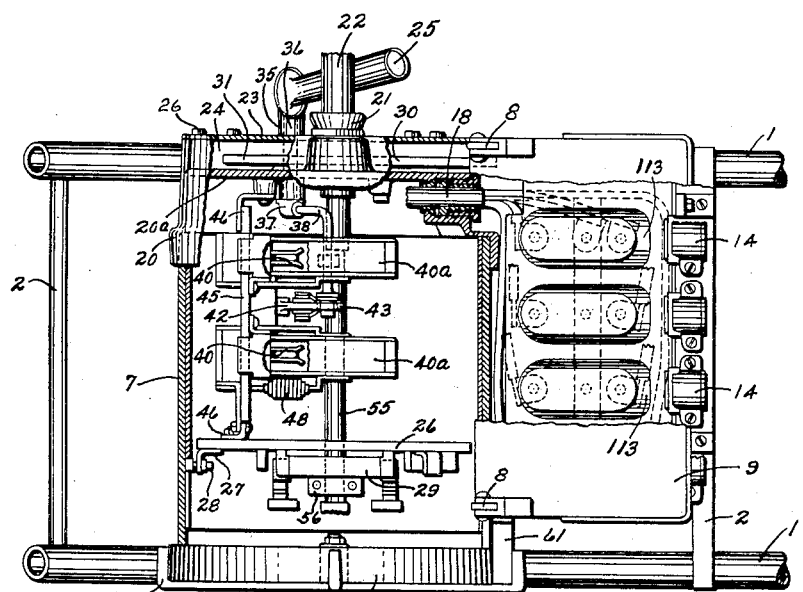
Fig. 2 shows a plan view thereof partly in section to show structural details.

The housing 6 contains a plurality of removable plug connectors 113, 113 to which cables 15, 15 are connected and the opposite end of the plug connectors 13, 13 are joined to cables such as 18 which (see Figs. 2 and 4) lead to the outlet side of the switch subsequently described. The cables 15, 15 lead to some appropriate portable power consuming device. The cables 15, 15 are rigidly secured in bushings 14, 14 and appropriate plugs 16 are disposed in said bushings when no power cable is held therein, the plugs 16 being attached to chains 17 that are fastened to the supporting elements 5, 5 of the portable distribution device. From the foregoing it is apparent that a plurality of outlets may be provided in the junction box to supply any number of current consuming devices from a single power cable connected to the distribution box.

The switch housing 7 is provided with a cover 19 at its one end that is preferably threaded thereto, and which cover when removed makes the fuse clips accessible to the operator. At the opposite end of the switch housing 7 is a cover 20 that is permanently rigidly secured to that end of housing 7 and which supports the inlet cable 22 in an explosion-proof gland or coupling 21, which may be of a construction similar to that shown in copending application, Serial No. 418,748, filed the 12th day of November, 1941 and entitled Junction boxes which has been issued as U. S. Patent #2,299,873, dated October 27, 1942. The cable 22 is connected to the inlet side of the switch subsequently described and is actuated by means of a handle 25 connected to a shaft 36 that is rotatably supported in the end walls constituting cover 20. The cover 20, as shown in the drawings, is provided with an inner wall 20a integrally associated with the cover 20 and is also provided with a removable cover plate 23 secured to the cover by means of a plurality of screws 26 with a space 24 between the plate 23 and the inner wall 20a in which the cover and switch interlocking mechanism for controlling the opening of cover 9 is disposed.

Internally of the switch housing 7 there is a support 26 on which are mounted a plurality of fuse clips and fuses 29 and the support 26 is fixed in housing 7 on a bracket 27 rigidly secured to the wall of housing 7 by means of a screw or other holding element 28. The bracket 27 mounting the support 26 is fixed thereto in any convenient manner.

A plurality of such bracket and screw elements 27 and 28 are provided to hold the support 26 in the proper position within the switch housing 7.

One method and means of interlocking the switch handle 25 and the cover 9 comprises a lever 30 having an extension 30a thereon which is slotted as at 31 and which has an enlarged portion rotatably receiving the shaft 36. On shaft 36 within the enlarged portion of 30 a key or cross-bar 32 is assembled that in the open position of the switch is arranged to be coaxial with the slot 31 provided in the extended portion 30a. The bar or lever 30 is pivotally connected to the bracket 33, integrally associated with the cover 9, by means of a pivot pin 34. When the element 32 is disposed such that it can enter the slot 31, which occurs when they lay in the same plane which is at such times as when the switch is open, the cover 9 may be opened thereby exposing to view the plug connectors 13, 13 in the housing 6.

The switch handle 25 has an eye 35 in which the shaft 36 is received. The shaft 36 extends inwardly to the interior of the switch housing and has connected thereto an elbow 37 to which a bent rod 38 is secured whereby the switch blade elements 39 are brought into engagement or disengagement with contacts 40, 40, enclosed in arc shields 40a, 40a, by means of pressure element 43 which is slidably received on one arm of the spring hinge element 42 associated with contact actuating lever 38 through a bushing 41. The hinge 42 has one end thereof secured to an insulating element 44 connecting the blades 39, 39 and the other end thereof is carried by the rod 38. The spring hinge 42 connection makes possible a quick break switch. The contact elements 40, 40 of the switch are fixed to a supporting element 45 that is rigidly held in the housing 7 to the support 26 and to the inner wall of the cover 20 by means of a plurality of screw and bracket elements 46. The switch blades 39 are hinged to support 45 at 47 and thence connected to the conduction in the cable 22. The rod element 38 is directly engaged with the switch contactor elements by means of the slotted element 43 that allows the bushing 43 and rod 38 to move relatively of each other. Associated with the contactors are blow-out coils 48, only one of which is shown whose function is to extinguish any arc that may be drawn when the switch is opened.

The cover 19, as has been previously indicated, is threaded on to the end of the housing 7 and provision is made for interlocking the opening of the cover 19 with the opening and closing of the switch such that the latter will be held in an open position while the cover is open. One method of accomplishing this relationship is to provide the cover 19 with a centrally disposed pivot element 49 which is received in a boss on the cover over which eye 50 of the lever 51 is placed and held thereon by suitable means to pivotally secure the lever 51 to the cover 19. The lever 51 is then pivotally associated with a second lever 52 by means of a pin 53 in which the lever 51 has a clevis formation thereon adapted to receive an eye on the second lever 52. The lever 52 is in the form of a right angular element that has an eye thereon by means of which the lever 52 is pivotally secured to a bar or rod 55 and held thereon by nut 55b. Rod 55 is axially slidably received in appropriate bearings 56 and 57 associated respectively with the housing 7 and its cover 20. The rod 55 has a reduced end 55a that is slidably received in the bearing 57. The rod 55 has rigidly secured thereon a right-angle bracket element 58 that is adapted to engage a hook element 59 welded to rod 36, the bracket 58 sliding over hook 59 when holding the switch blades 39 in an open position.

Figures 6, 7:
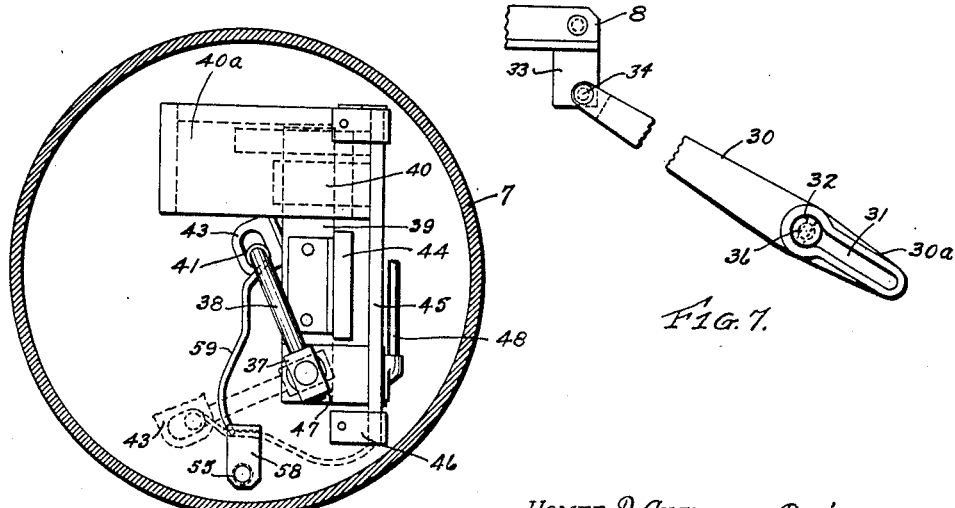
Fig. 6 shows an end elevational view of the switch housing from the end opposite from that of Fig. 5 and disclosing the details of the switch arm actuator.
Fig. 7 shows a detail of the switch handle interlock.

The operation of this interlock provides that as the cover 19 is rotated to remove it from the housing 7, it will axially move the shaft or rod 55, and as it moves to the left as shown in Fig. 3, the bracket 58 will project over the element 59, as shown more particularly in the dotted position thereof in Fig. 6, which is the open position of the switch and positively lock the switch in its open position. As soon as the cover 19 has been disengaged from the housing 7, it may be slid to one side away from the housing 7 made possible by means of the pivoted levers 51 and 52 and access thereby permitted to the fuse clips contained in housing 7.

One method of interlocking cover 19 with cover 7 is to equip cover 19 with a plurality of radial ribs 60 that extend over the edge of the cover element and then extend them externally axially of the cover. Cover 9 is provided with a projecting element or bracket 61 in the position shown. When cover 9 is closed the projection 61 will lay in between adjacent ribs 60 and in the path of rotation thereof to prevent rotation of the cover 19 on the housing 7 and its removal therefrom thereby confining rotation of the cover to the space between adjacent ribs.

The overall operation of the device comprises first putting switch handle 25 in its open position if not already in that position when it is desired to open the covers 9 and 19. It is now possible to open cover 9 since bar 32 is placed in line with slot 31 in bar 30 extension 30a. Since bar 30 is connected to cover 9 the latter may be opened since bar 30 may slide relatively of bar 32 in slot 31. When the switch handle 25 is in closed position bar 32 will not be able to enter slot 31 since their axes will not line in the same plane. When cover 9 is opened, projection 61 will move out of the path of rotation of ribs 60 permitting cover 19 to be removed from housing 7. The cover 9 as it is being unscrewed or removed from housing 7 will axially move rod 55 through the means of levers 51 and 52 pivotally connected to the cover 19 and the rod 55. The continued axial motion of rod 55 will cause bracket 58 mounted thereon to engage or hook above hook 59 on lever 38 to prevent any possible closure of the blades 39 of the switch. The reverse of the motion just described will put the switch in condition for closure. An extra precaution against switch closure is provided in that it will be impossible to close the switch as long as cover 9 is open because bar 32 or its equivalent will hold shaft 36 against rotation.

That which is considered new, novel and useful and which is desired to be protected by Letters Patent is as follows:

1. In a distribution device, the combination; an outlet box and a tiltable cover therefor; a switch housing and a removable cover therefor; a switch in said housing and means to open and close said switch; means interlocking said tiltable cover and switch such that said switch must be opened before said tiltable cover may be opened; means interlocking said two covers such that said tiltable cover must be opened before said switch housing cover may be opened and rod means extending axially of said switch housing having means thereon interlocking with means on said switch and with means on said switch housing cover such that said switch is held in an open position when said cover is in an open position.

2. In a distribution device, the combination: a switch housing enclosing a switch; handle actuated means to open and close said switch; an outlet box; a tiltable cover therefor; means connecting said cover and said handle actuated means; means in said handle actuated means adapted for sliding motion relative to said connecting means such that said cover may be tilted and said switch held open and further adapted to allow said handle actuated means to be rotated to open and close said switch and prevent opening of said cover.

3. In a power distribution mechanism, the combination; a switch housing; a cover removably secured thereto; a switch in said housing; a rod axially movable in said housing and connected to said cover; a hook on said rod; means on said switch engageable with said hook; and said cover axially moving said rod when being removed from said housing such that said hook may engage said switch means to hold said switch in an open position.

4. In a power distribution mechanism, the combination; a switch housing; a cover for said housing and a switch therein; an outlet box; a cover for said box; means to actuate said switch; means interlocking said box cover and said means such that said switch must be in an open position before said box cover may be opened; means interlocking said box cover and said switch housing cover; means interlocking said switch housing cover and said switch comprising a rod link connected to said switch housing cover, a hook on said switch means engageable with a hook on said rod; said switch housing cover removable after said outlet box cover is opened and axially shifting said rod to cause said rod and said switch means to engage when said switch housing cover is being opened.

5. In a distribution mechanism, the combination; an outlet box and a cover therefor; a switch housing and a cover therefor; each of said covers adapted to be opened and closed; a switch in said housing and mechanism for actuating same; a lever connecting said mechanism and said outlet box cover; means on said mechanism engaging a slot in said lever when said switch is open permitting said cover to be opened and having an aperture connected with said slot in which said mechanism rotates when said switch is opened and closed; means interlocking said two covers such that said switch housing cover cannot be opened until said outlet cover is open and means interlocking said mechanism and said switch housing cover such that said switch is locked in an open position when said switch housing cover is open.

6. In a power distribution mechanism; an outlet box; an openable cover therefor; a switch housing; an openable cover therefor; a switch in said housing; mechanism to open and close said switch; means interlocking said outlet box cover and said mechanism which includes a bar connected to said cover at its one end and having an axial slot in its other end, a key means on said mechanism registrable with said slot when said switch is in its open position to permit said outlet box cover to be opened; means interlocking said cover such that said switch housing cover may not open until said outlet box cover is open; and means interlocking said switch housing cover and said switch to lock said switch in open position when said switch housing cover is open, which includes a rod means axially slidable in said housing, a linkage pivoted to said cover and connectible to said rod, a hook on said switch, a hook on said rod engageable with said hook on said switch, said cover axially moving said rod when opening, thereby causing said hooks to engage locking said switch in its open position.

7. In a power distribution device, the combination; an outlet box; a cover for said box; a cylindrical switch housing; an axially movable cover for said housing; said box and housing being connected together; a switch in said housing; lug and bracket means arranged exteriorly of said covers interlocking said covers such that said switch housing cover may not be opened until after said outlet cover has been opened; and means interlocking said box cover and said switch such that said switch must be open before said box cover may be opened; said interlocking means preventing closure of said switch while said cover is open.

8. In a power distribution system, the combination; a cylindrical switch housing and an outlet box operatively associated; an axially movable cover for said outlet box; a cover for said switch housing; a switch in said switch housing; lug and bracket means interlocking said covers exteriorly thereof such that the housing cover may not be opened until said box cover has been opened including a bracket on said outlet box cover and radial disposed extensions on said switch housing; and means interlocking said housing cover and said switch such that said switch will be locked in its open position while said housing cover is open.

9. In a power distributing system, an outlet box and a cylindrical switch housing operatively associated; a tiltable cover for said outlet box, threadably secured thereto; an axially movable cover for said switch housing box; said covers being openable; a switch in said housing; slot and pin means interlocking said switch and said tiltable outlet cover such that it may not be opened until said switch is open; hook means on rod means interlocking said cylindrical housing cover and said switch such that said switch is locked in open position while said cover is being removed; and said cylindrical box cover interlock adapted to lock said switch in open position while said switch is open.

10. In a portable distribution device; a pair of skids; a rectangular housing for a plurality of power outlets; a cylindrical housing for a switch and fuse mechanism; means to support said housings on said skids; means to join said housings together; a switch operating mechanism; a tiltable cover for said outlet box; an axially movable cover for said switch and fuse box; means to interlock said covers; means to interlock said covers with said switch mechanism; and said switch and fuse housing being so disposed on said skids as to permit an axial removal of its cover.

11. In a portable explosion-proof switching and distributing device; an outlet box; a tiltable cover for said box; a cylindrical switch box secured thereto; a closure threadably associated therewith; a switch in said switch box; handle actuated means to open and close said switch; a slotted bar connectible between said tiltable cover and said means; a rod mounted in said switch box and relatively axially movable therein; means on said rod engageable with said switch; a linkage connecting said threaded cover and said rod such that when said cover is removed from said switch box said switch will be locked in open position; said slotted bar having a circular opening connected to said slot; means on said handle actuated means engageable with said slot to allow tilting of said cover and engageable in said opening to allow actuation of said switch; a bracket on said tiltable cover movable into the path of motion of means on said threaded cover to interlock said covers and to prevent opening of said switch housing until said outlet cover and said switch has been opened.

12. In a portable explosion-proof switch housing; a cylindrical housing; a cover threadably secured to one end; a switch in said housing; means to open and close said switch rotatably disposed in the other end of said housing; a rod axially movable in said housing; linkage means connecting said cover with said rod; means on said rod engageable with means on said switch, said rod means engaging said switch when said rod is moved axially by said cover to hold said switch in its open position.

13. In an explosion-proof switch housing and distribution system; an outlet box and a cylindrical switch housing operatively associated; a pivoted cover on said box; a cover for said housing threaded thereto; means on each of said covers interlocking same; a switch in said housing; means in said housing to open and close said switch; a handle to rotate said means; a bar having a slot therein connecting said pivoted cover and said means, said slot enlarged at its one end; means on said bar slidable in said slot when said pivoted cover is opened and rotatable in said enlarged portion when said switch is opened and closed; a rod slidable in said housing; a linkage connecting said threaded cover and said bar; and means on said bar engageable with said switch; said slotted bar and said rod interlocking said switch with each of said covers.

14. In a switch and outlet box, the combination; an outlet box and a switch housing operatively associated; a pivoted cover for said outlet box; an axially removable closure for said housing; means externally arranged on each of said covers interlocking them; a switch in said housing; means including a handle to open and close said switch; a bar connected to said cover having a longitudinally disposed slot therein connecting with an aperture at one end thereof; a pin on said means slidable in said slot and rotatable in said aperture; said pin slidable in said slot when said cover is to be opened and preventing opening of said switch and rotatable in said aperture when said switch is actuated and preventing opening of said cover; an axially disposed rod in said housing; a linkage connecting said rod and closure; means on said rod adapted to engage said switch when said cover is being axially removed thereby sliding said rod in said housing, said means locking said switch in open position while said closure is removed from said housing; and said closure and cover interlock being first disengaged before said slot and pin and said rod and switch interlocks become selectively operative.

15. In an outlet box and switch housing, the combination; an outlet box; a pivoted cover for said box; a switch housing associated with said box; a switch actuating shaft in said housing; a handle on said shaft; a bar connected to said cover having a connected aperture and a slot therein; a pin on said shaft and slidable in said slot to permit opening of said cover and rotatable in said aperture to permit rotation of said shaft and to simultaneously prevent opening of said cover.

LILLIAN C. CHANDLER,
*Administratrix of the Estate of Homer P. Chandler, Deceased.*